Patented May 11, 1937

2,080,366

UNITED STATES PATENT OFFICE 2,080,366

METHOD OF PURIFYING SECONDARY AMINES

Albert M. Clifford, Stow, Ohio, assignor to Wingfoot Corporation, Wilmington, Del., a corporation of Delaware No Drawing. Application December 31, 1935, Serial No. 57,007

12 Claims. (Cl. 260—128)

This invention relates to a method for purifying secondary aromatic amines which contain varying amounts of primary amines remaining unreacted in the process of making the secondary amines or otherwise occurring therein. More particularly, the invention relates to a process of preparing purified secondary aromatic amines for use as age resisters in rubber and the like in which primary amines are not desired since they have an activating effect on the accelerator which is used to promote the vulcanization of rubber. However, it will be understood that the invention is applicable to the treatment of any secondary aromatic amine product for any purpose whatsoever where a product free of primary amines is desired.

The customary procedure for removing primary amines from diaryl amines is to wash the reaction mass with a mineral acid, such as hydrochloric acid, which combines with the primary amine to form a water-soluble hydrochloride which can be washed out, leaving the water-insoluble secondary amines unaffected. This method is not wholly effective and is found to be inadequate with certain composite secondary amines remaining liquid at temperatures below 70° C. and containing relatively small amounts of primary amino compounds. In the case of such composite products, simple washing with dilute aqueous acids, such as HCl, does not readily effect purification, mainly for the reason that the composite product does not completely disperse and fails to offer large interfacial contact with the aqueous acid. For practical reasons, careful fractional distillation is not resorted to for the removal of these primary amino compounds.

It has now been found that suitable modification of this aqueous acid washing process can be effected, so as to accomplish satisfactory removal of primary amines, by adding to the reaction mass or medium, in addition to the acid, an emulsifying or dispersing agent. Thus, gelatin and glue have been found to be satisfactory and other inert materials of this type, such as agar-agar, saponin, etc., can be used.

A typical composite material to which the method of the invention can be applied is one which contains, predominantly, diphenylamine, mixed phenyl tolyl amines and mixed ditolyl amines. Such a mixture results from reacting phenols and cresols with primary amines, such as aniline and toluidine, at relatively high temperatures during which certain side reactions take place, the nature of which is not well known, with the result that primary amino substituted compounds occur in the reaction mass in addition to the desired secondary amines. These primary amino bodies are generally undesirable in an antioxidant composition intended for use in rubber in which vulcanization is accomplished by the aid of a mercapto-type accelerator since their effect is to activate greatly such accelerators, for example, mercaptobenzothiazole.

Where the secondary amines have a comparatively low melting point or where a mixture of the same, such as the above, has a low melting point, the liquid secondary amines, present in predominant amount, tend to shield the particles of primary amino compound from contact with the acid and it will readily be seen that, in such cases, prolonged agitation with dilute aqueous mineral acid may not succeed in bringing about contact of the acid with each particle of primary amine so as to solubilize the latter and segregate it in an aqueous phase distinct from the phase containing the secondary amines.

However, such a mixture can be effectively treated to remove primary amines in accordance with the principles of the present invention by proceeding as follows:

Example 1

Sixty parts of a composite product of the above-mentioned type were mixed with 250 parts of an aqueous 1% gelatin solution containing 5% HCl. The mixture was agitated for 9.5 hours at room temperature and then allowed to stand. The aqueous layer which separated was withdrawn and the residual oil was washed three successive times with about 120 parts of water. The recovered oil amounted to 45.2 parts.

It will be realized that the mentioned gelatin solution, which is in fact a colloidal solution, may be replaced by animal glue solution or by solutions of agar-agar, saponin, etc. Likewise, the hydrochloric acid may be replaced by other acids such as 5% formic, or acetic. Of course, the acid used must be capable of reacting with the primary amino bodies and should preferably be present in an amount at least sufficient to react with all of the primary amine which is estimated to be present.

While the foregoing procedure will in general be adequate for the purpose of purifying secondary amines from primary amines, the process may be modified by including with the acid and emulsifying or dispersing agent, a quantity of sodium nitrite or other metallic salt of nitrous acid, such as potassium nitrite. The nitrite has the function of forming diazo compounds with the primary amine salts resulting from reaction with the acid and these are either washed out as such or converted by hydrolysis to harmless phenols, phenols not being activating in their effect on the rubber compound containing a mercapto type accelerator. The secondary amines are not seriously affected by the nitrite because such secondary amines are not water-soluble and, consequently, do not react with the nitrite. The primary amines are sufficiently water-soluble to react with the nitrite to form diazo compounds which are more soluble in water than the primary amines from which they are formed and can thus be washed out. Where these diazo compounds are converted to phenols, they are thus removed from the sphere of the reaction, due to conversion of the amine salt, and the acid is set free to react with more primary amine in accordance with the following reactions:

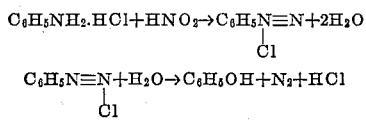

An example of this modified procedure is illustrated by the following example.

*Example 2*

A mixture, differing from that in Example 1 only in that 2 parts of sodium nitrite were added to the whole mixture, was agitated simultaneously with Example 1 under exactly the same conditions. After settling, the resulting oil layer was withdrawn, washed with twice its volume of water, boiled 10 minutes with a similar quantity of water, the oil separated and finally rewashed with water. The resulting oil amounted to 45.5 parts.

The effectiveness of the purification process described is shown by a comparison of the activating effects upon an accelerator in a vulcanizable rubber composition. In the case where a known activating material, such as the purified product obtained by following the procedure of the present invention, was used, the amount of accelerator required was 1.35 parts on 100 parts of rubber. On the other hand, when the original composite product, treated in the foregoing examples, was used without purification, it was necessary to reduce the accelerator requirement to 1.15 parts in order to obtain an equivalent, best cure in 70 minutes. When the purified product was used, that obtained by following the procedure in either Example 1 or Example 2 necessitated no readjustment of the accelerator ratio, i. e., the normal quantity of 1.35 parts gave the best cure in 70 minutes vulcanization time. This is an advantage in the manufacture of rubber articles since it should be possible to add each ingredient of the complex rubber compound without disturbing the balance of the other ingredients present. In other words, an age resister which can be added to a rubber compound without changing the established proportions of that compound is highly desirable and, indeed, necessary.

While there have been described above certain preferred embodiments of the invention, it will be apparent that the same may be modified as to the quantities used and details of the procedure outlined, as well as by substitution of equivalents, and it is, accordingly, intended that the invention shall be limited only by the appended claims which are intended to include all features of patentable novelty residing in the invention.

What I claim is:

1. In a method of separating secondary diaryl amines from primary aryl amines in aqueous solution by treatment with a quantity of acid sufficient to react with all of the primary amine present, the improvement which comprises adding to the reaction medium an emulsifying agent.

2. In a method of separating secondary diaryl amines from primary aryl amines in aqueous solution by treatment with a quantity of mineral acid sufficient to react with all of the primary amine present, the improvement which comprises adding to the reaction medium an emulsifying agent.

3. In a method of separating secondary diaryl amines from primary aryl amines in aqueous solution by treatment with a quantity of acid sufficient to react with all of the primary amine present, the improvement which comprises accompanying the acid with a colloid inert to the diaryl amine.

4. In a method of separating secondary diaryl amines from primary aryl amines in aqueous solution by treatment with a quantity of acid sufficient to react with all of the primary amine present, the improvement which comprises adding to the reaction medium an aqueous colloidal dispersing agent and then separating the diaryl amine product from the aqueous solution containing the primary amine constituent.

5. In a method of separating secondary diaryl amines from primary aryl amines in aqueous solution by treatment with a quantity of acid sufficient to react with all of the primary amine present, the improvement which comprises adding to the reaction medium a gelatin solution.

6. In a method of separating secondary diaryl amines from primary aryl amines in aqueous solution by treatment with a quantity of hydrochloric acid sufficient to react with all of the primary amine present, the improvement which comprises adding to the reaction medium a gelatin solution and then separating the resulting soluble primary amine hydrochloride from the diaryl amine product.

7. In a method of separating secondary diaryl amines from primary aryl amines in aqueous solution by treatment with a quantity of acid sufficient to react with all of the primary amine present, the improvement which comprises adding to the reaction medium an approximately 1%-gelatin solution containing about 5% of hydrochloric acid and then separating the modified primary amine constituents from the diaryl amine product.

8. In a method of separating secondary diaryl amines from primary aryl amines in aqueous solution by treatment with a quantity of acid sufficient to react with all of the primary amine present, the improvement which comprises adding glue to the reaction medium and then separating the purified diaryl amine.

9. In a method of separating secondary diaryl amines from primary aryl amines in aqueous solution by treatment with a quantity of acid sufficient to react with all of the primary amine present, the improvement which comprises adding saponin to the reaction medium and then separating the purified diaryl amine.

10. In a method of separating secondary diaryl amines from primary aryl amines in aqueous solution by treatment with a quantity of acid sufficient to react with all of the primary amine present, the improvement which comprises adding to the reaction medium an emulsifying agent and a salt of nitrous acid.

11. In a method of separating secondary diaryl amines from primary aryl amines in aqueous solution by treatment with a quantity of acid sufficient to react with all of the primary amine present, the improvement which comprises adding to the reaction medium an emulsifying agent and an alkali metal nitrite.

12. In a method of separating secondary diaryl amines from primary aryl amines in aqueous solution by treatment with a quantity of hydrochloric acid sufficient to react with all of the primary amine present, the improvement which comprises treating the reaction medium containing the amines with a gelatin solution and sodium nitrite.

ALBERT M. CLIFFORD.